US00RE36287E

United States Patent [19]

Ito et al.

[11] E Patent Number: Re. 36,287

[45] Reissued Date of Patent: Aug. 31, 1999

[54] POLYESTER FILM AND LITHOGRAPHIC PLATE

[75] Inventors: Katsuya Ito; Yoshiki Murakami; Ryoya Kobayashi; Taishi Iwai; Kazuhiro Abe; Chikao Morishige; Toshitake Suzuki; Yoshikazu Furuya, all of Ohtsu, Japan

[73] Assignee: Toyo Boseki Kabushiki Kaisha, Osaka, Japan

[21] Appl. No.: 09/045,204

[22] Filed: Mar. 20, 1998

Related U.S. Patent Documents

Reissue of:

[64] Patent No.: 5,503,953
Issued: Apr. 2, 1996
Appl. No.: 08/305,012
Filed: Sep. 13, 1994

[30] Foreign Application Priority Data

Sep. 14, 1993 [JP] Japan ..... 5-227691
Dec. 1, 1993 [JP] Japan ..... 5-301821

[51] Int. Cl.[6] ..... G03G 13/26

[52] U.S. Cl. ..... 430/49; 430/56; 430/60; 430/62; 428/480

[58] Field of Search ..... 430/49, 56, 60, 430/62; 428/480

[56] References Cited

U.S. PATENT DOCUMENTS

| | | | |
|---|---|---|---|
| 4,609,606 | 9/1986 | Noonan | 430/49 |
| 4,719,162 | 1/1988 | Nakano | 430/49 |

FOREIGN PATENT DOCUMENTS

| | | |
|---|---|---|
| 0 360 201 | 3/1990 | European Pat. Off. . |
| 58-94497 | 6/1983 | Japan . |
| 62-77936 | 4/1987 | Japan . |
| 1-11820 | 1/1989 | Japan . |
| 2-80247 | 3/1990 | Japan . |
| 4-320844 | 11/1992 | Japan . |

*Primary Examiner*—Kathleen Duda
*Attorney, Agent, or Firm*—Leydig, Voit & Mayer, Ltd.

[57] ABSTRACT

A lithographic plate includes a substrate made of a polyester film having a light transmittance of 50% or less, a bending angle in the range of 30° to 90°, and a rupture strength after being bent of 8 kg/mm$^2$ or more. Alternatively, a lithographic plate includes a substrate made of a polymer film containing a polyester and a thermoplastic resin incompatible with the polyester, wherein the polymer film is oriented along at least one axis and has minute cavities formed by the orientation, and the density of the film is in the range of 1.05 g/cm$^3$ to 1.3 g/cm$^3$.

28 Claims, 1 Drawing Sheet

POLYESTER FILM AND LITHOGRAPHIC PLATE

Matter enclosed in heavy brackets [ ] appears in the original patent but forms no part of this reissue specification; matter printed in italics indicates the additions made by reissue.

BACKGROUND OF THE INVENTION

1. Field of the Invention

The present invention relates to lithographic plates, such as presensitized (PS) plates, laser beam printer (LBP) plates, and pink plates.

2. Description of the Related Art

Examples of lithographic plates currently used in the field of light printing include direct drawing type printing plates such as LBP plates, electrophotographic plates such as pink plates, PS plates, and the like. An LBP plate is composed essentially of a substrate and a hydrophilic layer formed on the substrate, the hydrophilic layer functioning as an image receiving layer. A pink plate is composed essentially of an electrically conductive substrate and a photoconductive layer formed on the substrate, the photoconductive layer functioning as an image receiving layer. A PS plate is composed essentially of a substrate and a sensitized layer, e.g., a diazo sensitized layer, that is formed on the substrate, the sensitized layer functioning as an image receiving layer.

Examples of known materials for lithographic plates are aluminum plates, paper, plastic films, etc., as disclosed in Japanese Laid-Open Patent Publication Nos. 58-94497, 62-77936, and 4-320844. However, aluminum plates are expensive as well as difficult to handle. Paper is inexpensive but has poor durability and poor water resistance. Plastic films, which are known to overcome the above-mentioned problems, have insufficient flexibility and insufficient film strength after being bent, thus resulting in the problems of poor durability and insufficient printability when being wound around a print drum.

SUMMARY OF THE INVENTION

A lithographic plate of the present invention comprises a substrate made of a polyester film having a light transmittance of 50% or less, a bending angle in the range of 30° to 90°, and a rupture strength after being bent of 8 kg/mm$^2$ or more.

Alternatively, a lithographic plate of the present invention comprises a substrate made of a polymer film containing a polyester and a thermoplastic resin incompatible with the polyester; wherein the polymer film is oriented along at least one axis and has minute cavities formed by the orientation, and the density of the film is in the range of 1.05 g/cm$^3$ to 1.3 g/cm$^3$.

Alternatively, a lithographic plate of the present invention comprises a substrate made of a polymer film containing a polyester and a thermoplastic resin incompatible with the polyester; wherein the polymer film is oriented along at least one axis and has minute cavities formed by the orientation, and the density of the film is in the range of 1.05 g/cm$^3$ to 1.3 g/cm$^3$, the polymer film having a light transmittance of 50% or less, a bending angle in the range of 30° to 90°, and rupture strength after being bent of 8 kg/mm$^2$ or more.

In one embodiment of the present invention, the above-mentioned lithographic plate has a hydrophilic layer subjected to corona treatment and a photosensitive layer formed on the substrate in this order.

In another embodiment of the present invention, the hydrophilic layer is made of a composition containing a water-soluble or water-dispersible binder and zinc oxide dispersed in the binder, and the composition becomes a water-insoluble hydrophilic substance by the reaction between a component in an etchant for the lithographic plate and the zinc oxide.

In still another embodiment of the present invention, the above-mentioned lithographic plate has a conductive intermediate layer and a photoconductive layer formed on the surface of the substrate in this order, and has at least one of a conductive back coat layer and a dielectric back coat layer formed on the reverse surface of the substrate.

In still another embodiment of the present invention, the above-mentioned lithographic plate has a conductive intermediate layer and a hydrophilic layer formed on the substrate in this order, or has a hydrophilic layer having a surface resistivity in the range of $10^8$ Ω/cm$^2$ to $10^{13}$ Ω/cm$^2$ directly formed on the substrate.

In still another embodiment of the present invention, the surface resistivity of the conductive intermediate layer is in the range of $10^2$ Ω/cm$^2$ to $10^8$ Ω/cm$^2$.

In still another embodiment of the present invention, the surface resistivity of the conductive back coat layer is in the range of $10^2$ Ω/cm$^2$ to $10^{12}$ Ω/cm$^2$.

In still another embodiment of the present invention, the dielectric constant of the dielectric back coat layer is 5 or more.

Thus, the invention described herein makes possible the advantages of: (1) providing a lithographic plate having excellent flexibility such that the plate achieves very close contact with a print drum, etc. on which it is attached, thereby realizing a clear printing image; (2) providing a lithographic plate having excellent strength after being bent such that the plate has excellent durability when used in close contact with a print drum, etc.; (3) providing a lithographic plate having low light transmittance such that the plate achieves excellent concealing properties; (4) providing a lithographic plate having high processing facility during a punch hole-making process conducted when the plate is attached onto a print drum; and (5) providing a lithographic plate having excellent dimensional stability.

These and other advantages of the present invention will become apparent to those skilled in the art upon reading and understanding the following detailed description with reference to the accompanying figures.

DESCRIPTION OF THE PREFERRED EMBODIMENTS

Figure 1:
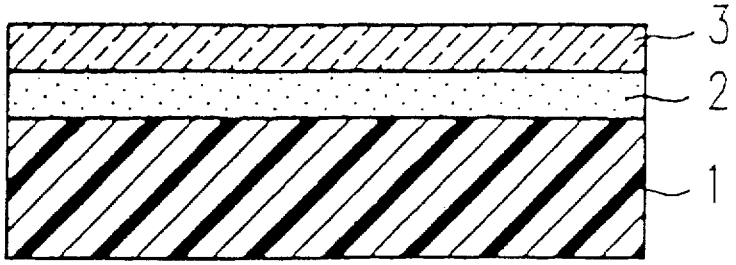
FIG. 1 is a schematic view showing an example of a lithographic plate according to the present invention.

Polyesters to be used for the substrate of the lithographic plate according to the present invention can be obtained by polycondensation of an aromatic dicarboxylic acid such as terephthalic acid, isophthalic acid, and naphthalene dicarboxylic acid, or an ester thereof with a glycol such as ethylene glycol, diethylene glycol, 1,4-butanediol, or neopentyl glycol. Such polyesters can be produced by directly reacting an aromatic carboxylic acid with a glycol, by subjecting an alkylester of an aromatic dicarboxylic acid and a glycol to an ester exchanging reaction and then to a polycondensation reaction, or by polycondensation of a diglycolester of an aromatic dicarboxylic acid. Examples of such polyesters include polyethylene terephthalate, polyethylenebutylene terephthalate, and polyethylene-2,6-naphthalate. The polyester to be used for the substrate of the lithographic plate according to the present invention can be a homopolyester including one kind of aromatic dicarboxylic acid and one kind of glycol, or can be a copolyester including two or more kinds of aromatic dicarboxylic acids and/or glycols. The polyester can also be a copolyester including a non-aromatic dicarboxylic acid. The polyester according to the present invention preferably contains 70 mol % or more, more preferably 80 mol % or more, and most preferably 90 mol % or more of, ethylene terephthalate units, butylene terephthalate units, or ethylene-2,6-naphthalate units as dicarboxylic acid units.

A combination of at least one of the above-mentioned polyesters and a thermoplastic resin which is incompatible with the polyester (hereinafter, such a thermoplastic resin will be referred to as "polyesterincompatible thermoplastic resin") can preferably be used for the substrate of the lithographic plate according to the present invention. Examples of polyester-incompatible thermoplastic resins include polystyrene resins, polyolefin resins, acrylic resins, polycarbonate resins, polysulfone resins, cellulose resins, and polyamide resins. Among such thermoplastic resins, polyolefin type resins such as polymethylpentene and polypropylene are most preferable. These resins serve to create a number of cavities in the produced film during a stretching process thereof, as described later.

The polyester to be used for the substrate of the lithographic plate according to the present invention can be formed into a film by a known method. For example, the polyester can be formed by using at least one kind of polyester and, if necessary, a polyesterincompatible thermoplastic resin, a light shielding material, and/or various other additives, with the use of a known method such as a process including kneading and extrusion. The light shielding material serves to improve the concealing properties of the film. Examples of suitable light shielding materials are particles of inorganic materials such as titanium dioxide, silicon dioxide, calcium carbonate, barium sulfate, aluminum oxide, kaolin, and talc. Examples of additives to be used for the present invention are colorants, anti-fading agents, fluorescent agents, and antistatic agents.

In cases where a polymer mixture of a polyester and a polyester-incompatible thermoplastic resin is used, the mixture can be formed into a film by any of the following methods, for example: (1) a method where a mixture of both resins and, if necessary, a light shielding material, and/or various additives are kneaded in an extruder and extruded and solidified to obtain a film; (2) a method where each of the two resins optionally including a light shielding material and/or additives is separately kneaded, the resultant melted resins being mixed in an extruder, and the mixture is extruded and solidified to obtain a film; and (3) a method where a polyester-incompatible thermoplastic resin is added to a reaction mixture for producing a polyester, and chips obtained by dispersing the resins in the reaction mixture are prepared, and the chips are kneaded and extruded so as to be solidified to obtain a film.

The resultant unstretched film may be a slightly oriented film or a non-oriented film. Preferably, the film is formed into a film which is oriented along at least one axis by roll stretching, tenter stretching, inflation stretching, etc. The mechanical strength of the film can be improved by the orientation. In cases where a mixture of the above-mentioned polyester and a polyester-incompatible thermoplastic resin is included in the film, the thermoplastic resin is present in the polyester in various forms, such as dispersed spheres, ellipsoids, and threads.

When such a film is stretched, peeling occurs at the interface between the polyester and the polyester-incompatible thermoplastic resin dispersed within the polyester, so that a number of cavities are created in the above-mentioned polymer mixture. Cavities are similarly created in cases where inorganic microparticles are present in the polyester. The polyesterincompatible thermoplastic resin may, although depending on the kinds of the thermoplastic resin and the polyester and/or the number of cavities desired in a given volume, be added in the range of 3 to 35 parts by weight, and preferably 5 to 20 parts by weight, for every 100 parts by weight of the polyester. The inorganic microparticles are added in the range of 0.01 to 30 parts by weight, and preferably 1 to 10 parts by weight, for every 100 parts by weight of the polyester in cases where they are intended to create cavities, although the inorganic microparticles can also function as a light shielding material. The diameter of an inorganic microparticle is, in general, in the range of 0.1 to 5 μm.

By stretching the unstretched film including a polyester and a polyester-incompatible thermoplastic resin by the sequential biaxial stretching method, where the film is roll-stretched along the longitudinal direction and then tenter-stretched along the transverse direction, a "stiff" film can be obtained due to the orientation of the resultant film. Such stretching of the film is preferably conducted under the following conditions:

1) The temperature of the roll(s) used during the roll-stretching should be equal to or lower than the sum of the second order transition temperature ( i. e., glass transition temperature ) of the polyester and 30° C. (or preferably be in the range of about 50° C. to 140° C.), with the stretching ratio being in the range of 2.0 to 5.0. This condition creates a number of cavities within the film.
2) The tenter stretching should be conducted at a temperature in the range of 80° C. to 150° C., with the stretching ratio being in the range of 2.8 to 5.
3) A heat treatment, following the stretching, should be conducted at a temperature of 200° C. or more, more preferably 220° C. or more, and most preferably 230° C. or more. Moreover, it is preferable to reduce the residual stress by 3% to 8% during the heat treatment by relaxation, and the film should preferably have a heat shrinkage ratio smaller than 2% at 150° C.; these conditions are satisfied when the heat treatment is conducted in the above-mentioned temperature ranges.

The stretched or unstretched polyester film thus obtained, which is to become the substrate of the lithographic plate according to the present invention, preferably satisfies the following Requirement 1 and/or Requirement 2:

Requirement 1: The light transmittance of the polyester film should be 50% or less; the film should permit bending at an angle (hereinafter referred to as "bending angle") in the range of 30° to 90°; and the rupture strength after the film has been bent is 8 kg/mm$^2$ or more. The "bending angle" is defined as an angle constituted by a portion of a film where it has been bent by the application of a predetermined intensity of heat and a predetermined amount of load, the heat and load being removed after a predetermined period of time so as to leave the film in that state. The bending angle should be measured under the following conditions:

A film (15 mm wide and 40 mm long) to be tested is folded in half with the fold running along the width direction. The folding is conducted by applying a load of 1.5 kgf/mm$^2$ at 25° C. for one minute with the use of a heat sealer (HG-100; manufactured by Toyo Seiki K.K.). Next, the load is removed, and the film is left at 25° C. and at RH (Relative Humidity) of 65% for 5 minutes.

Then, the angle of the folded portion of the film is measured.

A number of methods can be used to obtain a film satisfying the above-mentioned Requirement 1. For example, the light transmittance can be adjusted by adding an appropriate amount of the above-mentioned light shielding material to the polyester. As for the bending angle and the rupture strength, the kinds and amounts of the polyester, resins to be optionally added to the polyester (such as elastomers, e.g., polyolefin, and copolyesters), and various additives such as plasticizers and fillers may be selected; the film can be made to include cavities; or the conditions for the heat treatment can be optimized.

A film that satisfies Requirement 1 shows excellent concealing properties, achieves very close contact with a print drum, etc. on which it is attached, and maintains excellent strength after being bent. If the light transmittance of the film is larger than 50%, the film is so transparent that it may present a problem in attaching the plate onto a print drum, etc. If the film has a bending angle outside the above-mentioned range, sufficient contact with a print drum, etc. on which it is attached cannot be attained, thereby leading to the problem of unclear images. If the film has a rupture strength smaller than 8 kg/mm$^2$, the durability of the film is insufficient. Moreover, a film to be used for the present invention should preferably have an initial elasticity of 300 kg/mm$^2$ or more in order to maintain excellent flexibility and sufficient strength after being bent. The thickness of the film to be used for the present invention should generally be in the range of 50 to 300 μm.

Requirement 2: A film containing a mixture of a polyester and a polyester-incompatible thermoplastic resin should have an orientation along at least one axis, and have minute cavities created by the orientation, with the film density (apparent specific gravity) being in the range of 1.05 g/cm$^3$ to 1.3 g/cm$^3$. The film density is derived in accordance with the following Equation 1:

$$\text{Film density} = w/(5 \times 5 \times t \times 1000) \qquad \text{Eq.1}$$

wherein w represents the weight (g) of a sample film measuring 5 cm by 5 cm; and t represents the average thickness (μm) of the sample film.

The cavity inclusion rate of such a film can be controlled by adjusting the kind and amount of the polyester-incompatible thermoplastic resin. The cavity inclusion rate can also be controlled by adding inorganic particles such as titanium dioxide, foaming agents capable of generating gas, and the like instead of, or in addition to, the thermoplastic resin. Such inorganic particles, foaming agents, etc. function as cavity creating agents, so that the cavity inclusion rate can be controlled by adjusting the amounts of these substances to be added. On the other hand, it is very difficult to control the cavity inclusion rate by varying the extrusion conditions. By increasing the shear stress during the kneading and extrusion, the cavity creating agent can be finely dispersed, thereby resulting in a smaller total volume of cavities included in the film.

The density of the above-mentioned film can be controlled by adjusting such parameters as the cavity inclusion rate, the kinds and amounts of polyester, thermoplastic resin, and additives, the stretching conditions, the heat treatment conditions after the stretching, as in the case of Requirement 1.

The above-mentioned film has excellent dimensional stability in the above-mentioned density range of 1.05 g/cm$^3$ to 1.3 g/cm$^3$ and achieves very close contact with a print drum, etc. Moreover, the film has high processing facility during a punch hole-making process conducted when the plate is attached onto a print drum. If the film has a density smaller than 1.05 g/cm$^3$, the film is likely to deform under external stresses, so that the dimensions of the plate may change due to tensile stress during the attachment process to the print drum, possibly resulting in dislocation of colors when conducting multicolor printing. If the film has a density larger than 1.3 g/cm$^3$, the film has insufficient flexibility and cushioning properties so that the contact between the plate and the print drum weakens, resulting in unclear images. It is preferable that the above-mentioned film has a heat shrinkage smaller than 2% at 150° C.

The above-mentioned film, and in particular a cavity-including oriented film satisfying Requirement 2 or both Requirements 1 and 2, may preferably be embodied as a multilayer film including at least two layers, and preferably three or more layers, the cavity inclusion rate gradually increasing from the front layer towards the back layer along the thickness direction of the film. In the case of a multilayer film of layers X, Y, and Z (where layers X and Z constitute the front face and the back face of the multilayer film, respectively), for example, the respective cavity inclusion rates of the layers should satisfy the relationship Z>Y>X.

For example, such a multilayer film can be obtained by filling three extruders with different resins, coextruding the resins to obtain an unstretched multilayer film, and stretching the multilayer film. Alternatively, such a multilayer film can be obtained by filling three extruders with different resins, extruding the resins to obtain unstretched films, laminating the films into a multilayer film, and then stretching the multilayer film. Alternatively, such a multilayer film can be obtained by filling three extruders with different resins, extruding the resins to obtain unstretched films, stretching the films, and then laminating the films. The above-mentioned multilayer film can also be obtained by preparing an unstretched multilayer film by casting and stretching the resultant multilayer film, or by preparing films by casting, stretching the films, and then laminating the films to obtain a multilayer film. Whether an extrusion method or a casting method is adopted, it is preferable to obtain an unstretched multilayer film first and then to stretch the multilayer film.

The substrate for the above-mentioned multilayer structure should have sufficient flexibility, excellent contact with a print drum or the like, and sufficient strength. A multilayer structure of an appropriate configuration should be selected depending on the kind of print drum, transfer paper, and ink. For example, a multilayer structure in which a multilayer film is affixed to a film having no cavities can be suitably used, the cavity inclusion rate of the multilayer film gradually increasing from the front layer towards the back layer along the thickness direction of the film. Alternatively, a multilayer structure can be suitably used in which two multilayer films, the cavity inclusion rate of each multilayer film gradually increasing from the front layer towards the back layer along the thickness direction of the film, are affixed to each other on the back sides thereof, thus resulting in a structure where the cavity inclusion rate is highest in the vicinity of the front and back faces of the structure and decreases towards the middle portion of the structure. For example, in the case where a multilayer film consisting of layers X, Y, and Z is affixed to another kind of film, it is preferable that layer X having the lowest cavity inclusion rate is present within 1/20 of the thickness of the entire multilayer structure from the front face of the multilayer film; that layer Y having a middle cavity inclusion rate is present in the next 1/5 of the thickness of the multilayer structure; and that layer Z having the highest cavity inclusion rate is present in the next ¼ of the thickness of the multilayer structure. Preferably, the cavity inclusion rate of layer X is 5% or less by volume; the cavity inclusion rate of layer Y is in the range of 5% to 25% by volume; the cavity inclusion rate of layer Z is in the range of 10% to 30% by volume; and the difference between the cavity inclusion rate of layer Y and that of layer Z is in the range of 5% to 20% by volume.

A film thus obtained and satisfying Requirement 2 has excellent mechanical strength owing to the orientation treatment. Since the weight of the film is reduced due to the presence of the cavities created by the orientation, the film has the advantage of enhanced facility with which it can be dealt with, and the advantage of low fabrication cost. The film also acquires heat resistance due to the presence of the cavities. Moreover, this film has excellent flexibility owing to the cavities, that is, the film can achieve very close contact with a print drum, thereby enabling clear printing of images and letters. Furthermore, one can write on this film because this film has concealing properties and is generally white, and because numerous bumps are formed on the surface of the film, the bumps originating from the polyester-incompatible thermoplastic resin.

The above-described film to be used for the substrate of the lithographic plate according to the present invention preferably satisfies both of Requirements 1 and 2.

The lithographic plate according to the present invention has the above-mentioned substrate. Representative examples of such a lithographic plate includes the following three types A, B, and C.

As shown in FIG. 1, the lithographic plate according to an A type includes a hydrophilic layer 2 and a photosensitive layer 3 on a substrate 1 in this order. The surface of the hydrophilic layer 2 is subjected to corona treatment.

Figure 2:
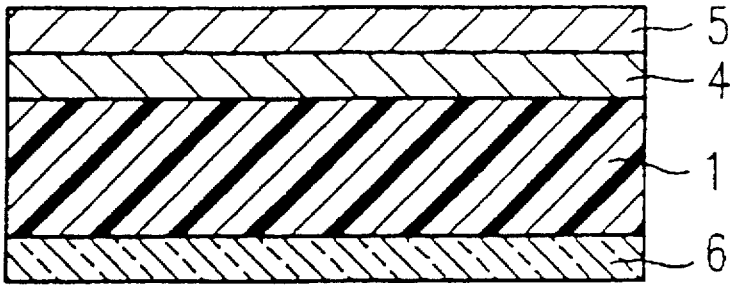
FIG. 2 is a schematic view showing another example of a lithographic plate according to the present invention.

As shown in FIG. 2, the lithographic plate according to a B type includes a conductive intermediate layer 4 and a photoconductive layer 5 on the substrate 1 in this order, and a back coat layer 6 on a reverse surface of the substrate 1.

Figure 3A:
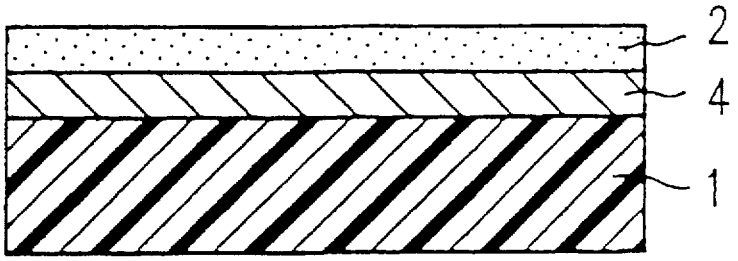
FIGS. 3A and 3B are schematic views showing still another example of a lithographic plate according to the present invention.
Figure 3B:
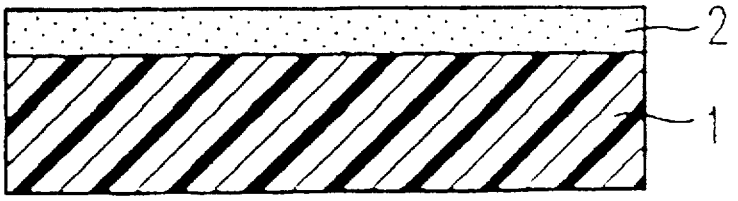

As shown in FIG. 3A, the lithographic plate according to a C type includes the conductive intermediate layer 4 and the hydrophilic layer 2 on the substrate 1 in this order. Alternatively, the lithographic plate according to a C type includes the hydrophilic layer 2 having a surface resistivity of $10^8$ Ω/cm$^2$ to $10^{13}$ Ω/cm$^2$ on the substrate 1, as shown in FIG. 3B.

The A type lithographic plate is used as a PS plate which is subjected to printing after exposure and development. For preparing the A type lithographic plate, the hydrophilic layer 2 and the photosensitive layer 3 are formed on the substrate 1, in this order. Some portions of the photosensitive layer 3 are etched with an etchant (developer) to expose the corresponding portions of the hydrophilic layer 2. The exposed portions of the hydrophilic layer 2 form non-image portions. In such a lithographic plate, the photosensitive layer 3 defines a lipophilic portion, to which oily ink readily adheres, while the hydrophilic layer 2 defines a hydrophilic portion, to which oily ink does not adhere. When water is applied onto the surface of the lithographic plate, the water adheres to the hydrophilic portion, and not to the lipophilic portion, so that the hydrophilic portion (i.e., the hydrophilic layer 2) more strongly repels oily ink. As a result, the non-image area effectively repels the oily ink during printing, making it possible to obtain a clearer image. The hydrophilic layer 2 is made of a composition containing a binder, a metal oxide such as zinc oxide dispersed in the binder, and if required, a crosslinking agent, and a crosslinking auxiliary agent. Examples of the binder include water-soluble resins such as polyvinyl alcohol (PVA), carboxymethyl cellulose (CMC), hydroxyethyl cellulose, casein, gelatin, and water-soluble polyurethane; and water-dispersible resins such as a polymer or a copolymer made of vinyl acetate, vinyl chloride, acrylic esters, styrene, butadinene, and ethylene. The metal oxide such as zinc oxide reacts with a component present in the etchant, in particular, a cyan compound such as $K_3Fe(CN)_6$, whereby the composition becomes water-insoluble while retaining hydrophilicity. This is caused by the formation of a zinc-containing cyano compound due to the reaction between the metal oxide and the component in the etchant. As the binder, PVA is generally used because of its outstanding hydrophilicity and strength when forming a coating. If required, a crosslinking agent is contained in the composition depending upon the kind of the binder. For example, the crosslinking agent of PVA includes epoxy resin, isocyanate resin, and melamine resin. In general, melamine resin is used.

A crosslinking auxiliary agent such as an organic amine salt is preferably used together with the crosslinking agent. The crosslinking auxiliary agent such as an organic amine salt is contained in the composition in an amount of 2% to 10% by weight, and preferably 4% to 8% by weight based the total weight of a solid content of the composition. When the crosslinking auxiliary agent is contained in the composition in these ranges, a crosslinking degree of a polymer contained in the hydrophilic layer 2 is increased, resulting in the enhancement of characteristics such as water resistance, solvent resistance, and coating strength. Hydrophilicity of the hydrophilic layer 2 can also be controlled to the desired degree by the crosslinking auxiliary agent. In the case where the crosslinking auxiliary agent is mixed in an amount of less than 2% by weight, the crosslinking degree of a polymer contained in the hydrophilic layer 2 is low, resulting in a possibility of poor water resistance, solvent resistance, and coating strength. On the other hand, in the case where the content of the crosslinking auxiliary agent exceeds 10% by weight, the hydrophilicity of the hydrophilic layer 2 is decreased, and in some cases, a background staining arises when printing is conducted using the resulting printing plate.

The hydrophilic layer 2 is usually obtained by coating an emulsion containing a binder, a metal oxide such as zinc oxide, a crosslinking agent, and if required a crosslinking auxiliary agent onto the substrate 1 and drying the coated substrate. The hydrophilic layer 2 usually has a thickness in the range of 3 to 20 μm. In the case where the adhesion between polyester which is a main component of the substrate 1 and the binder contained in the hydrophilic layer 2 is insufficient, it is recommended that an appropriate underlining layer be formed between the substrate 1 and the hydrophilic layer 2. As the underlining layer, for example, a resin composition containing, as its main component, a copolyester resin containing a branched glycol and a resin containing blocked isocyanate is used. The resin composition forming the underlining layer is coated onto the substrate 1 in the form of a solution or an emulsion and then dried. As a method for coating the resin composition onto the substrate 1, any conventional methods such as off-line coating and in-line coating can be used.

The hydrophilic layer 2 of the lithographic plate according to the present invention can be subjected to corona discharge treatment, frame plasma treatment, or electron ray treatment. Because of these treatments, the lithographic plate according to the present invention will have suitable hydrophilicity while retaining the other characteristics. After the hydrophilic layer 2 is subjected to the above-mentioned treatment such as corona discharge treatment, the photosensitive layer 3 is formed thereon. The photosensitive layer 3 generally has a thickness in the range of 1 to 10 μm. Known negative and positive photosensitive materials can be used for the photosensitive layer 3.

The B type lithographic plate is generally called a pink plate. The photoconductive layer 5 is charged and exposed to light to remove electric charge on light-irradiated portions. Charged toner is given to the charged photoconductive layer 5 to form a toner image on charge remaining portions. The toner image is fixed, and thus the lithographic plate with the toner image fixed on the photoconductive layer 5 can be obtained. The portions where toner is fixed are lipophilic and the photoconductive layer is hydrophilic. For preparing the B type lithographic plate, the conductive intermediate layer 4 is formed on the substrate 1. In general, the substrate 1 has a thickness in the range of 75 to 200 μm, and the conductive intermediate layer 4 has a thickness in the range of 0.1 to 5 μm. The conductive intermediate layer 4 is made of powders of a conductive material and a binder. Examples of the conductive material include a metal selected from zinc, magnesium, potassium, barium, indium, molybdenum, aluminum, titanium, and silicon; oxides of the metal; and composite oxides containing at least two metals mentioned above. Preferably, crystalline metal oxides are used. Carbon black can also be used. The conductive material is mixed with a polymer binder such as cellulose resin, acetal resin, urethane resin, and acrylic resin, and the resulting mixture is dispersed or dissolved in an organic solvent or an aqueous solvent. The mixture thus obtained is applied, for example, by being coated onto the surface of the substrate 1. Alternatively, cationic or anionic conductive resin can be layered on the substrate instead of the application of the mixture containing the powders of the conductive material and the binder. In particular, as cationic conductive resins, those having quaternary nitrogen is preferred.

The conductive intermediate layer 4 has a surface resistivity in the range of $10^2$ Ω/cm$^2$ to $10^8$ Ω/cm$^2$, and preferably in the range of $10^4$ Ω/cm$^2$ to $10^7$ Ω/cm$^2$. In the case where the surface resistivity exceeds $10^8$ Ω/cm$^2$, the flow of charge is blocked and toner adheres to a non-image area when a toner image is formed on the surface of the photoconductive layer 5 as described later. In the case where the surface resistivity is less than $10^2$ Ω/cm$^2$, pinholes are caused The photoconductive layer 5 can be formed for example as follows: Photoconductive powders such as zinc oxide and titanium oxide and a hydrophilic and insulating synthetic resin binder are dispersed in an organic solvent. Then, a sensitizer is added to the resulting dispersion. The mixture thus obtained is coated onto the conductive intermediate layer 4, followed by drying. In general, the photoconductive layer 5 has a thickness in the range of 5 to 20 μm.

The back coat layer 6 can be made of a conductive substance or a dielectric substrate. Herein, the "dielectric substrate" refers to a substance which is electrically polarized when being placed in an electrostatic field. In general, the charge of the surface of the photoconductive layer 5 moves to the substrate 1 when the photoconductive layer 5 is conducted with light. According to the present invention, since the substrate 1 is made of an insulating material, when the photoconductive layer 5 is conducted with light, the movement of the charge from the surface of the photoconductive layer 5 is blocked, resulting in an unclear toner image. In order to solve this problem, the photoconductive layer 5 is electrically connected to the back coat layer 6. More specifically, in the case of using the conductive back coat layer 6, the charge is moved from the surface of the photoconductive layer 5 to the back coat layer 6 because of the conductivity of the back coat layer 6; and in the case of using the dielectric back coat layer, the charge is moved from the surface of the photoconductive layer 5 to the back coat layer 6 because of the electric polarization of the back coat layer 6.

The conductive back coat layer 6 can be made of the same material as that of the conductive intermediate layer 4. The conductive back coat layer 6 has a surface resistivity in the range of $10^2$ Ω/cm$^2$ to $10^{12}$ Ω/cm$^2$, and preferably in the range of $10^5$ Ω/cm$^2$ to $10^9$ Ω/cm$^2$. In the case where the surface resistivity exceeds $10^{12}$ Ω/cm$^2$ the movement of charge is blocked to cause pinholes. On the other hand, in the case where the surface resistivity is less than $10^2$ Ω/cm$^2$, a clear image cannot be obtained.

The dielectric back coat layer 6 can be made of an organic dielectric polymer or a mixture containing an inorganic compound with a high dielectric constant and a polymer binder. In general, the back coat layer 6 has a thickness in the range of 1 to 10 μm. Examples of the organic dielectric polymer include polyvinylfluoride, polyvinylidenefluoride, polyurethane, cellulose nitrate, cyanoethylene cellulose, phenyl-formaldehyde resin, chlorinated polyethylene, polyacrylonitrile, quaternary nitrogen containing compound, an organic boron compound, and ion exchange resins. Examples of the inorganic compound include barium titanate, lead titanate, potassium niobate, potassium dihydrogenphosphate, ammonium dihydrogenphosphate, ammonium sulfate, and potassium sodium tartrate. However, the organic dielectric polymer and the inorganic compound are not limited to these examples. The dielectric back coat layer 6 has a dielectric constant of 5 or more, and preferably 10 or more. In the case where the dielectric constant is less than 5, the movement of charge is blocked, resulting in an unclear image.

The C type lithographic plate is used as a direct drawing type printing plate and, for example, is used as an LBP plate. According to the present invention, both a single-layer type and a double-layer type can be used. FIG. 3A shows the lithographic plate of double-layer type. The lithographic plate of the double-layer type includes the conductive intermediate layer 4 and the hydrophilic layer 2 on the substrate 1 in this order. The conductive intermediate layer 4 can be formed in the same way as in the conductive intermediate layer 4 of the B type lithographic plate, and the hydrophilic layer 2 can be formed in the same way as in the hydrophilic layer 2 of the A type lithographic plate.

FIG. 3B shows the lithographic plate of the single-layer type. The hydrophilic layer 2 shown in this figure can also be formed in the same way as in the hydrophilic layer 2 of the A type lithographic plate. The hydrophilic layer 2 shown in FIG. 3B has a surface resistivity in the range of $10^8$ Ω/cm$^2$ to $10^{13}$ Ω/cm$^2$.

In the C type lithographic plate, for example, an electrostatic latent image is formed with a laser beam after the plate is charged, and then charged toner is allowed to adhere to the latent image and is fixed thereon in the same way as in the B type lithographic plate, whereby the lithographic plate is used for printing. When using the C type lithographic plate, a clear image can be formed. More specifically, the double-layer type has the conductive intermediate layer, charge is preferably conducted. In the case of the single-layer type, since the hydrophilic layer has a predetermined surface resistivity, charge is preferably conducted. Thus, a clear image can be formed.

The A, B, and C type lithographic plates have specific substrates. According to the present invention, because of the use of the above-mentioned substrate, any of the A, B, and C type lithographic plates have outstanding adhesion with respect to a print drum, durability, high processing facility during a punch- hole-making process, and clarity of printed matter. In particular, the A type lithographic plate causes no background staining and the lithographic plate has outstanding durability during printing because of its water resistance. The B type lithographic plate causes no pinholes and has outstanding clarity of printed matter. The C type lithographic plate causes no background staining during printing, and attains outstanding clarity of printed matter. The lithographic plate has outstanding durability during printing because of its water resistance.

Examples

Hereinafter, the present invention will be described by way of illustrative examples. It is noted that the present invention is not limited thereto.

Items of evaluation in the examples according to the present invention are described below. Unless otherwise stated, "parts" and "%" in the examples are based on weight.

(1) Characterization of a substrate material (i) Intrinsic viscosity of polyester Polyester was dissolved in a mixed solvent containing 6 parts of phenol and 4 parts of tetrachloroethane. The resulting solution was measured for intrinsic viscosity at 30° C.

(ii) Melt flow index of polystyrene resin

Polystyrene resin was measured for melt flow index at 200° C. with a load of 5 kg in accordance with JIS-K7210.

(2) Light transmittance

A film was measured for light transmittance using a Poic integration sphere type H.T.R. meter (manufactured by Nihon Seimitsu Kogaku) in accordance with JIS-K6714.

(3) Bending angle of a film

A film (15 mm wide and 40 mm long) to be tested was folded into half with the fold running along the width direction. The folding was conducted by applying a load of 1.5 kgf/mm$^2$ at 25° C. for one minute with the use of a heat sealer (HG-100; manufactured by Toyo Seiki K.K.). Next, the load was removed, and the film was left at 25° C. and at a RH (Relative Humidity) of 65% for 5 minutes. Then, the angle of the folded portion of the film was measured.

(4) Rupture strength of a bent film

A film with a width of 15 mm and a length of 100 mm was bent in half in the same way as in the above-mentioned item 3. The film was spread flat, and was stretched using an Autograph ( HG-3000, manufactured by Shimadzu Corporation) under the conditions of a distance between chucks of 40 mm and a tensile speed of 200 mm/min. Thus, the film was measured for rupture strength.

(5) Density of a film

A film was cut into a square (5 cm×5 cm). The thickness of the square-shaped film was measured at 50 portions thereof, and the density Of the film was obtained from the following equation:

$$\text{Density of a film (g/cm}^3\text{)} = w/(5\times5\times t\times1000)$$

wherein w represents the weight (g) of a sample film measuring 5 cm by 5 cm; and t represents the average thickness (μm) of the sample film.

(6) Initial modulus of elasticity

The initial modulus of elasticity was measured using ASTM D-882-81, Method A.

(7) Thermal shrinkage

Two marks were put on a film with a width of 10 mm and a length of 250 mm so that the distance between the two marks was 200 mm. The film was fixed in the longitudinal direction under a predetermined tension of 5 g, and an objective distance A, i.e., the distance between the two marks, was measured. Then, the film was allowed to stand in an oven at 150° C. for 30 minutes under no tension, and an objective distance B, i.e., the distance between the two marks was measured. Using the measured distances, the thermal shrinkage of the film was obtained from the following equation:

$$(A-B)/A\times100\ (\%)$$

(8) Cavity content of a layered sheet

A cross section of a layered sheet was observed with a scanning electron microscope, and each layer was photographed. The photograph of each layer was traced on a tracing film and cavity portions were filled in with black. The traced picture in which the cavity portions which were filled in with black was image-processed with an image processor, and the ratio of an area of the filled-in portions to the entire picture was obtained as a cavity content.

A scanning electron microscope used in the experiment: S-510, manufactured by Hitachi Ltd.

An image processor used in the experiment: Luzex IID, manufactured by Nireko Co., LTD.

(9) Flexibility

A plate was attached to a print drum of an offset printing machine (TEXEL AR01, manufactured by Shinanokenshi). The adhesion between the plate and the print drum was evaluated as the flexibility of the plate in the following manner.

○: The plate and the print drum completely adhered to each other.

Δ: A slight gap was recognized around the attachment portion between the plate and the print drum.

×: A gap was recognized around the attachment portion between the plate and the print drum.

(10) Processing facility for punch hole making

Processing facility for punch hole making was evaluated by using a punch-hole-making device which was an accessory of the offset printing machine used in item 9.

○: Twitch was not recognized at the periphery of a hole.

Δ: Slight twitch was recognized at the periphery of the hole.

×: Much twitch was recognized at the periphery of the hole.

(11) Clarity of printed matter

Ten thousand coat sheets were printed by using the offset printing machine used in the item 9, and the clarity of the resulting printed matter was evaluated as described below.

One thousand copies were made in black and white printing and in color printing, respectively. Regarding the black and white printing, an experiment was conducted using a pattern containing 150 parallel black lines arranged along a length extending 1 inch, the total area of the black lines being 10% of the entire pattern. Regarding the color printing, the presence of color shift was evaluated.

(In the case of black and white printing)

○: One hundred and fifty lines were completely reproduced on each of the printed matter.

Δ: Part of the lines was missing.

×: A number of the lines were missing.

(In the case of color printing)

○: No color shift was recognized.

Δ: Slight color shift was recognized, causing no problems for practical use.

×: Much color shift was recognized, causing problems for practical use.

(12) Surface peeling strength

An adhesive tape with a width of 18 mm (manufactured by Nichiban Co., Ltd.) was attached to the surface of a film, and the adhesive tape was peeled from the film at an angle of 150°. Thus, the relative surface peeling strength was evaluated in the following manner:

5: The adhesive tape was completely peeled.

4: The adhesive tape was almost completely peeled.

3: The adhesive tape was moderately peeled.

2: The adhesive tape was hardly peeled.

1: The adhesive tape was not peeled at all.

(13) Adhesion

Incisions were formed on a photosensitive layer with a knife to obtain a checkerboard pattern (10×10 squares) on the surface of the photosensitive layer. Then, an adhesive tape (No. 405, manufactured by Nichiban Co., Ltd.) was attached to the surface of the photosensitive layer, and the adhesive tape was rapidly peeled at an angle of 90°. Thus, the adhesion of the photosensitive layer was evaluated in the following manner:

○: Ninety or more squares of the checkerboard pattern remained on the surface of the photosensitive layer.

Δ: At least sixty but less than ninety squares of the checkerboard pattern remained on the surface of the photosensitive layer.

×: Less than sixty squares of the checkerboard pattern remained on the surface of the photosensitive layer.

Example 1

Polyethyleneterephthalate with an intrinsic viscosity of 0.62 as a material for an X layer; a mixture containing 85% of polyethyleneterephthalate, 10% of general-purpose polystyrene with a melt flow index of 2.0 g/10 min., and 5% of titanium dioxide having an average particle size of 0.3 μM as a material for a Y layer, and a mixture containing 80% of polyethyleneterephthalate, 15% of general-purpose polystyrene with a melt flow index of 2.0 g/10 min., and 5% of titanium oxide with an average particle size of 0.3 μm as a material for a Z layer were separately extruded using three twin-screw extruders equipped with a T-die at 290° C. The resulting respective films were allowed to adhere to a chill roll with static electricity, thereby obtaining a layered unstretched sheet (X/Y/Z/Y/X=5/20/50/50/20/5 μm). Then, the layered unstretched sheet was subjected to roll stretching in the longitudinal direction at a roll temperature of 83° C. with a stretching ratio of 3.5, and was subjected to tenter stretching in the lateral direction at 140° with a stretching ratio of 3.5. The resulting stretched sheet was heat-treated while residual stress was being relaxed by 4% at 235° C. to obtain a layered stretched sheet (X/Y/Z/Y/X=5/20/50/20/5 μm) which is used as a substrate.

Table 1 shows a list of components constituting the X, Y, and Z layers of the substrate. In Table 1, A-$TiO_2$ represents anatase type titanium dioxide, and as zeolite, JC-20 (manufactured by Mizusawa Industrial Chemical Co., Ltd.) having an average particle size of 2.0 μm was used. The results of the evaluation of the substrate are shown in Table 2. In Table 2, each of the evaluations of rupture strength, initial modulus of elasticity, and thermal shrinkage was conducted twice, and both of the results are shown in Table 2.

A coating solution containing 0.5 part of 5% solution of a resin containing blocked isocyanate (ELASTRON Cat. 32, manufactured by Dai-ichi Kogyo Seiyaku Co., Ltd.), 4 parts of 30% solution of a copolyester resin containing a branched glycol (MD16, manufactured by Toyobo Co., Ltd.), 0.3 part of 20% solution of colloidal silica (SNOWDEX OL, manufactured by Nissan Chemical Industries, Ltd.), 45 parts of water, and 44.2 parts of isopropyl alcohol was coated onto the substrate with a wire bar (#5). The coated substrate was dried at 160° C. for one minute to form an underlining layer with an average coating amount of 0.2 g/$m^2$ on the substrate.

Then, a coating solution containing 12 parts of zinc oxide (SAZEX #2000, manufactured by Sakai Chemical Industry Co., Ltd.), 32 parts of 15% aqueous solution of PVA (GOHSENOL NL-05, manufactured by The Nippon Synthetic Chemical Industry, Co., Ltd.), 2 parts of 80% solution of melamine resin (SUMITEC REGIN M3, manufactured by Sumitomo Chemical Co., Ltd.), 1 part (corresponding to 6% of a solid content of the coating solution) of 35% solution of organic amine salt (ACCELERATOR ACX, manufactured by Sumitomo Chemical Co., LTD.), 34 parts of water, and 20 parts of isopropyl alcohol, was coated onto the underlining layer with a wire bar (#10). The resulting coated substrate was dried at 160° C. for one minute to form a hydrophilic layer with an average coating amount of 7 g/$m^2$ on the underlining layer. Then, the hydrophilic layer was subjected to corona treatment by applying electric power in the range of 250 to 300 W to knife-shaped electrodes disposed on the hydrophilic layer with a distance of 1 mm between each other, with H.F.GENERATOR HFSS-201 (manufactured by Kasuga Electric Works Ltd.). A positive photosensitive liquid (PC-54X, manufactured by KOYO Chemical Industry Co., Ltd.) was coated onto the hydrophilic layer, followed by drying to form a photosensitive layer with an average coating amount of 3 g/$m^2$ on the hydrophilic layer, resulting in a lithographic plate. Thereafter, the photosensitive layer was exposed, and was developed with an etchant (PP CLEAN H, manufactured by Nikken Chemicals Co., Ltd.). Ten thousand coat sheets were printed using an offset printing machine (TEXELAR 01, manufactured by Shinanokenshi) equipped with the lithographic plate thus obtained. These coat sheets were evaluated based on the above-mentioned items of evaluation. The results of the evaluation of the lithographic plate are shown in Tables 2 and 3.

Examples 2 to 6

In each example, a lithographic plate was prepared in the same way as in Example 1, except that materials for a substrate in Table 1 were used. The substrate and the obtained lithographic plate were evaluated based on the above-mentioned items of evaluation. The results of the evaluation are shown in Tables 2 and 3. The results of the following Examples 7 to 14 and Comparative Examples 1 to 7 are also shown in Tables 2 and 3.

Comparative Example 1

A lithographic plate was prepared in the same way as in Example 1, except that materials for a substrate in Table 1 were used. The lithographic plate was evaluated based on the above-mentioned items of evaluation.

Comparative Examples 2 to 3

In each comparative example, a lithographic plate was prepared in the same way as in Example 1, except that materials for a substrate in Table 1 were used. The lithographic plates were evaluated based on the above-mentioned items of evaluation.

TABLE 1

| | X layer | | Y layer | | Z layer | |
|---|---|---|---|---|---|---|
| | Components | Amount (%) | Components | Amount (%) | Components | Amount (%) |
| Example 1 | PET | 100 | PET | 85 | PET | 80 |
| | | | Polystyrene | 10 | Polystyrene | 15 |
| | | | A-$TiO_2$ | 5 | A-$TiO_2$ | 5 |
| Example 2 | PET | 95 | PET | 85 | PET | 80 |
| | A-$TiO_2$ | 5 | Polystyrene | 10 | Polystyrene | 15 |
| | | | A-$TiO_2$ | 5 | A-$TiO_2$ | 5 |
| Example 3 | PET | 97 | PET | 84 | PET | 80 |
| | Zeolite | 3 | Polystyrene | 10 | Polystyrene | 15 |
| | | | A-$TiO_2$ | 5 | A-$TiO_2$ | 5 |
| Example 4 | PET | 95 | PET | 85 | PET | 80 |
| | A-$TiO_2$ | 5 | Polystyrene | 10 | Polypropylene | 15 |
| | | | A-$TiO_2$ | 5 | A-$TiO_2$ | 5 |
| Example 5 | PET | 95 | PET | 85 | PET | 80 |
| | Polystyrene | 5 | Polystyrene | 10 | Polystyrene | 15 |
| | | | A-$TiO_2$ | 5 | A-$TiO_2$ | 5 |
| Example 6 | PET | 90 | PET | 85 | PET | 80 |
| | Polystyrene | 10 | Polystyrene | 10 | Polystyrene | 15 |
| | | | A-$TiO_2$ | 5 | A-$TiO_2$ | 5 |
| Comparative Example 1 | PET | 95 | PET | 90 | PET | 80 |
| | A-$TiO_2$ | 5 | Polystyrene | 5 | Polystyrene | 15 |
| | | | A-$TiO_2$ | 5 | A-$TiO_2$ | 5 |
| Comparative Example 2 | PET | 95 | PET | 80 | PET | 80 |
| | A-$TiO_2$ | 5 | Polystyrene | 15 | Polystyrene | 15 |
| | | | A-$TiO_2$ | 5 | A-$TiO_2$ | 5 |
| Comparative Example 3 | PET | 95 | PET | 85 | PET | 60 |
| | A-$TiO_2$ | 5 | Polystyrene | 10 | Polystyrene | 35 |
| | | | A-$TiO_2$ | 5 | A-$TiO_2$ | 5 |

Example 7

A dispersion containing carbon black and acrylic resin was coated onto a substrate obtained in Example 1, followed by drying to form a conductive intermediate layer on the substrate. Then, photoconductive zinc oxide (#4000, manufactured by Sakai Chemical Industry Co., Ltd.), LR 333 which is an acrylic resin (manufactured by Mitsubishi Rayon Co., Ltd.), and ACRYDIC 44-179 which is an acrylic resin (manufactured by Dainippon Ink and Chemicals, Inc.) were mixed in a ratio of 63:7:3. To this mixture, 0.1 part of Rose Bengal as a sensitizer and 90 parts of toluene were added. The coating mixture thus obtained was coated onto the conductive intermediate layer of the substrate. The resulting coated substrate was dried at 160° C. for one minute to form a photoconductive layer having a thickness of 13 μm on the conductive intermediate layer.

Furthermore, a whisker of potassium titanate (TISTAT-PHS, manufactured by Otsuka Chemical Co., Ltd. ), a copolyester resin (MD16, manufactured by Toyobo Co., Ltd.), water, and isopropyl alcohol were mixed in a ratio of 30:30:33:8. The resulting mixture was coated onto a reverse surface of the substrate with a wire bar (#10). The coated substrate thus obtained was dried at 160° C. for one minute to form a back coat layer having a thickness of 0.3 μm on the reverse surface of the film, thereby obtaining a lithographic plate. A toner image was formed and fixed on the photoconductive layer, and the plate was evaluated in the same way as in Example 1.

Example 8

A lithographic plate was prepared in the same way as in Example 7, except that an electroconductive polymer (CHEMISTAT 6300H, manufactured by Sanyo Chemical Industries, Ltd.) was used for the back coat layer. The lithographic plate was evaluated based on the above-mentioned items of evaluation.

Example 9

A mixture containing 80 parts of polyethyleneterephthalate with an intrinsic viscosity of 0.62, 15 parts of general-purpose polystyrene with a melt flow index of 3.0 g/10 min., and 5 parts of anatase type titanium oxide was extruded by using a twin-screw extruder at 285° C. The resulting sheet was allowed to adhere to a chill roll with static electricity to obtain an unstretched sheet. Then, the unstretched sheet was subjected to roll stretching in the longitudinal direction at a roll temperature of 80° C. with a stretching ratio of 3.0, and was subjected to tenter stretching in the lateral direction at 130° C. with a stretching ratio of 3.2. The bi-axially stretched sheet was heat-treated at 220° C. to obtain a film with a thickness of 125 μm which is used as a substrate. The density of the film was 1.11 g/cm$^3$.

A coating solution containing 6 parts of 20% solution of a resin containing blocked isocyanate (ELASTRON H-3, manufactured by Dai-ichi Kogyo Seiyaku Co., Ltd. ), 0.5 part of 5% solution of a crosslinking agent for the resin (ELASTRON Cat. 32, manufactured by Dai-ichi Kogyo Seiyaku Co., Ltd. ), 4 parts of 30% solution of a copolyester resin containing a branched glycol (MD16, manufactured by Toyobo Co., Ltd. ), 0.3 part of 20% suspension of colloidal silica (SNOWDEX OL, manufactured by Nissan Chemical Industries, Ltd. ), 45 parts of water, and 44.2 parts of isopropyl alcohol was coated onto the stretched film with a wire bar (#5). The coated substrate was dried at 160° C. for one minute to form an underlining layer with an average coating amount of 0.2 g/m$^2$.

Then, a lithographic plate was prepared, exposed, and developed in the same way as in Example 1. Ten thousand coat sheets were printed by using an offset printing machine (TEXELAR 01, manufactured by Shinanokenshi) equipped with the lithographic plate thus obtained. These coat sheets were evaluated based on the above-mentioned items of evaluation.

Example 10

A lithographic plate was prepared in the same way as in Example 9, except that the weight ratio between the polyethyleneterephthalate with an intrinsic viscosity of 0.62 and the general-purpose polystyrene was altered and a stretched film (i.e., a substrate) with a density of 1.05 g/cm$^3$ was obtained.

Example 11

A lithographic plate was prepared in the same way as in Example 9, except that the weight ratio between the polyethyleneterephthalate with an intrinsic viscosity of 0.62 and the general-purpose polystyrene was altered and a stretched film (i.e., a substrate) with a density of 1.24 g/cm$^3$ was obtained.

Comparative Example 4

A lithographic plate was prepared in the same way as in Example 9, except that the weight ratio between the polyethyleneterephthalate with an intrinsic viscosity of 0.62 and the general-purpose polystyrene was altered and a stretched film (i.e., a substrate) with a density of 0.78 g/cm$^3$ was obtained.

Comparative Example 5

A lithographic plate was prepared in the same way as in Example 9, except that the weight ratio between the polyethyleneterephthalate with an intrinsic viscosity of 0.62 and the general-purpose polystyrene was altered and a stretched film (i.e., a substrate) with a density of 0.93 g/cm$^3$ was obtained.

Comparative Example 6

A lithographic plate was prepared in the same way as in Example 9, except that the weight ratio between the polyethyleneterephthalate with an intrinsic viscosity of 0.62 and the general-purpose polystyrene was altered and a stretched film (i.e., a substrate) with a density of 1.39 g/cm$^3$ was obtained.

Example 12

A lithographic plate was prepared in the same way as in Example 9, except that the underlining layer was not formed.

Example 13

A lithographic plate was prepared in the same way as in Example 9, except that the hydrophilic layer was not subjected to corona treatment.

Example 14

A mixture containing 80 parts of polyethyleneterephthalate with an intrinsic viscosity of 0.62, 15 parts of general-purpose polystyrene with a melt flow index of 3.0 g/10 min., and 5 parts of anatase type titanium dioxide was extruded by using a twin-screw extruder at 285° C. The resulting sheet was allowed to adhere to a chill roll with static electricity to obtain an unstretched sheet. Then, the unstretched sheet was subjected to roll stretching in the longitudinal direction at a roll temperature of 80° C. with a stretching ratio of 3.0, and was subjected to tenter stretching in the lateral direction at 130° C. with a stretching ratio of 3.2. The stretched sheet was heat-treated at 220° C. to obtain a stretched film with a thickness of 125 pm which is used as a substrate.

A conductive coating mixture containing a whisker of potassium titanate was coated onto the substrate to form a conductive intermediate layer, and the coated substrate was dried. Separately, 62.5 parts of zinc oxide (SAZEX #2000, manufactured by Sakai Chemical Industry Co., Ltd.), 5 parts of ACRYDIC 44-179 which is an acrylic resin (manufactured by Dainippon Ink and Chemicals, Inc.), and 32.5 parts of toluene were dispersed in a ball mill for 2 hours. The obtained dispersion, ACRYDIC 44-179 which is an acrylic resin (manufactured by Dainippon Ink and Chemicals, Inc.), LR333 which is an acrylic resin (manufactured by Mitsubishi Rayon Co., Ltd.), silica gel having a secondary particle size of 4 μm (HK 125, manufactured by DEGUSSA), toluene, and cyclohexanone were mixed in a weight ratio of 34.00:0.30:5.85:1.07:30.00:14.30. The resulting coating mixture was coated onto the conductive intermediate layer of the substrate with a wire bar (#10), and the resulting coated substrate was dried at 160° C. for one minute to form a hydrophilic layer having a thickness of 7 μm. An image was formed on the hydrophilic layer with a laser printer (TN7270.PS1, manufactured by Toshiba Corporation). The resulting hydrophilic layer was treated with an etchant (PP CLEAN H, manufactured by Nikken Chemicals Co., Ltd.).

Ten thousand coat sheets were printed by using an offset printing machine (TEXELAR 01, manufactured by Shinanokenshi) equipped with the lithographic plate with an image thus obtained. Each image portion of the printed matter thus obtained was magnified by 10 times, and blur, depth of color, etc. of each image portion was evaluated by visual inspection. This revealed that each image was clearly observed without any blur.

One thousand coat sheets were printed by using an offset printing machine manufactured by Ricoh Co., Ltd., and the background staining of the 1000th sheet thus obtained was evaluated. This revealed that almost no background staining was observed in a non-image portion of the printed sheet.

Comparative Example 7

A lithographic plate was prepared in the same way as in Example 14, except that the conductive intermediate layer was not formed.

The same evaluation as that of Example 14 was made, revealing that the image portion was clearly observed without any blur, but background staining was observed over the entire non-image portion.

TABLE 2

| | Light transmittance (%) | Bending angle (degree) | Rupture strength (kg/mm²) | Density (g/m²) | Initial modulus of elasticity (kg/mm²) | Thermal shrinkage (%) | Cavity content (%) X | Y | Z |
|---|---|---|---|---|---|---|---|---|---|
| Example 1 | 10 | 80 | 12/12 | 1.18 | 330/320 | 1.2/0.6 | 0 | 10 | 17 |
| Example 2 | 7 | 78 | 11/12 | 1.16 | 330/320 | 1.2/0.6 | 2 | 12 | 18 |
| Example 3 | 8 | 76 | 11/11 | 1.16 | 330/320 | 1.2/0.6 | 4 | 12 | 18 |
| Example 4 | 6 | 75 | 9/10 | 1.05 | 320/310 | 1.4/0.8 | 2 | 11 | 20 |
| Example 5 | 9 | 72 | 10/10 | 1.14 | 315/315 | 1.3/0.8 | 4 | 13 | 19 |
| Example 6 | 6 | 70 | 12/12 | 1.08 | 300/285 | 1.2/0.6 | 10 | 12 | 19 |
| Example 7 | 10 | 80 | 12/12 | 1.18 | 330/320 | 1.2/0.6 | 0 | 10 | 17 |
| Example 8 | 10 | 80 | 12/12 | 1.18 | 330/320 | 1.2/0.6 | 0 | 10 | 17 |
| Example 9 | — | — | — | 1.11 | — | — | — | — | — |
| Example 10 | — | — | — | 1.05 | — | — | — | — | — |
| Example 11 | — | — | — | 1.24 | — | — | — | — | — |
| Example 12 | — | — | — | 1.11 | — | — | — | — | — |
| Example 13 | — | — | — | 1.11 | — | — | — | — | — |
| Comparative example 1 | 13 | 96 | 15/14 | 1.31 | 350/350 | 1.6/0.9 | 2 | 2 | 18 |
| Comparative example 2 | 7 | 70 | 7/7 | 1.10 | 310/310 | 1.2/0.6 | 2 | 19 | 20 |
| Comparative example 3 | 4 | 55 | 6/6 | 0.95 | 270/280 | 1.0/0.5 | 2 | 14 | 38 |
| Comparative example 4 | — | — | — | 0.78 | — | — | — | — | — |
| Comparative example 5 | — | — | — | 0.93 | — | — | — | — | — |
| Comparative example 6 | — | — | — | 1.39 | — | — | — | — | — |

TABLE 3

| | Flexibility | Processing facility for punch hole making | Printed matter Black and white | Printed matter colored | Peeling strength | Adhesion |
|---|---|---|---|---|---|---|
| Example 1 | ○ | — | — | ○ | 1 | — |
| Example 2 | ○ | — | — | ○ | 1 | — |
| Example 3 | ○ | — | — | ○ | 1 | — |
| Example 4 | ○ | — | — | ○ | 1 | — |
| Example 5 | ○ | — | — | ○ | 1 | — |
| Example 6 | ○ | — | — | ○ | 1 | — |
| Example 7 | ○ | — | — | ○ | 1 | — |
| Example 8 | ○ | — | — | ○ | 1 | — |
| Example 9 | ○ | ○ | ○ | ○ | — | ○ |
| Example 10 | ○ | ○ | ○ | ○ | — | ○ |
| Example 11 | ○ | ○ | ○ | ○ | — | ○ |
| Example 12 | ○ | ○ | ○ | ○ | — | Δ |
| Example 13 | ○ | ○ | ○ | ○ | — | ○ |
| Comparative example 1 | X | — | — | ○ | 1 | — |
| Comparative example 2 | ○ | — | — | X | 1 | — |
| Comparative example 3 | ○ | — | — | X | 1 | — |
| Comparative example 4 | ○ | ○ | ○ | X | — | ○ |
| Comparative example 5 | ○ | ○ | ○ | Δ | — | ○ |
| Comparative example 6 | X | X | Δ | Δ | — | X |

As shown in Table 2, the lithographic plate according to the present invention is excellent in adhesion between the plate and a print drum, durability, processing facility during a punch hole-making process, and clarity of a printed matter.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A lithographic plate comprising a substrate made of a polyester film having a light transmittance of 50% or less, a bending angle in the range of 30° to 90°, and a rupture strength after being bent of 8 kg/mm² or more.

2. A lithographic plate according to claim 1, which has a hydrophilic layer subjected to corona treatment and a photosensitive layer formed on the substrate in this order.

3. A lithographic plate according to claim 2, wherein the hydrophilic layer is made of a composition containing a water-soluble or water-dispersible binder and zinc oxide dispersed in the binder, and the composition becomes a water-insoluble hydrophilic substance by the reaction between a component in an etchant for the lithographic plate and the zinc oxide.

4. A lithographic plate according to claim 1, which has a conductive intermediate layer and a photoconductive layer formed on the surface of the substrate in this order, and has at least one of a conductive back coat layer and a dielectric back coat layer formed on the reverse surface of the substrate.

5. A lithographic plate according to claim 4, wherein the surface resistivity of the conductive intermediate layer is in the range of $10^2$ Ω/cm² to $10^8$ Ω/cm².

6. A lithographic plate according to claim 4, wherein the surface resistivity of the conductive back coat layer is in the range of $10^2$ Ω/cm² to $10^{12}$ Ω/cm².

7. A lithographic plate according to claim 4, wherein the dielectric constant of the dielectric back coat layer is 5 or more.

8. A lithographic plate according to claim 1, which has a conductive intermediate layer and a hydrophilic layer formed on the substrate in this order, or has a hydrophilic layer having a surface resistivity in the range of $10^8$ Ω/cm$^2$ to $10^{13}$ Ω/cm$^2$ directly formed on the substrate.

9. A lithographic plate comprising a substrate made of a polymer film containing a polyester and a thermoplastic resin incompatible with the polyester, wherein the polymer film is oriented along at least one axis and has minute cavities formed by the orientation, and the density of the film is in the range of 1.05 g/cm$^3$ to 1.3 g/cm$^3$.

10. A lithographic plate according to claim 9, which has a hydrophilic layer subjected to corona treatment and a photosensitive layer formed on the substrate in this order.

11. A lithographic plate according to claim 10, wherein the hydrophilic layer is made of a composition containing a water-soluble or water-dispersible binder and zinc oxide dispersed in the binder, and the composition becomes a water-insoluble hydrophilic substance by the reaction between a component in an etchant for the lithographic plate and the zinc oxide.

12. A lithographic plate according to claim 9, which has a conductive intermediate layer and a photoconductive layer formed on the surface of the substrate in this order, and has a conductive or dielectric back coat layer formed on the reverse surface of the substrate.

13. A lithographic plate according to claim 12, wherein the surface resistivity of the conductive intermediate layer is in the range of $10^2$ Ω/cm$^2$ to $10^8$ Ω/cm$^2$.

14. A lithographic plate according to claim 12, wherein the surface resistivity of the conductive back coat layer is in the range of $10^2$ Ω/cm$^2$ to $10^{12}$ Ω/cm$^2$.

15. A lithographic plate according to claim 12, wherein the dielectric constant of the dielectric back coat layer is 5 or more.

16. A lithographic plate according to claim 9, which has a conductive intermediate layer and a hydrophilic layer formed on the substrate in this order, or has a hydrophilic layer having a surface resistivity in the range of $10^8$ Ω/cm$^2$ to $10^{13}$ Ω/cm$^2$ directly formed on the substrate.

17. A lithographic plate comprising a substrate made of a polymer film containing a polyester and a thermoplastic resin incompatible with the polyester, wherein the polymer film is oriented along at least one axis and has minute cavities formed by the orientation, and the density of the film is in the range of 1.05 g/cm$^3$ to 1.3 g/cm$^3$, the polymer film having a light transmittance of 50% or less, a bending angle in the range of 30° to 90°, and rupture strength after being bent of 8 kg/mm$^2$ or more.

18. A lithographic plate according to claim 17, which has a hydrophilic layer subjected to corona treatment and a photosensitive layer formed on the substrate in this order.

19. A lithographic plate according to claim 18, which has a hydrophilic layer is made of a composition containing a water-soluble or water-dispersible binder and zinc oxide dispersed in the binder, and the composition becomes a water-insoluble hydrophilic substance by the reaction between a component in an etchant for the lithographic plate and the zinc oxide.

20. A lithographic plate according to claim 17, which has a conductive intermediate layer and a photoconductive layer formed on the surface of the substrate in this order, and has a conductive or dielectric back coat layer formed on the reverse surface of the substrate.

21. A lithographic plate according to claim 20, wherein the surface resistivity of the conductive intermediate layer is in the range of $10^2$ Ω/cm$^2$ to $10^8$ Ω/cm$^2$.

22. A lithographic plate according to claim 20, wherein the surface resistivity of the conductive back coat layer is in the range of $10^2$ Ω/cm$^2$ to $10^{12}$ Ω/cm$^2$.

23. A lithographic plate according to claim 20, wherein the dielectric constant of the dielectric back coat layer is 5 or more.

24. A lithographic plate according to claim 17, which has a conductive intermediate layer and a hydrophilic layer formed on the substrate in this order, or has a hydrophilic layer having a surface resistivity in the range of $10^8$ Ω/cm$^2$ to $10^{13}$ Ω/cm$^2$ directly formed on the substrate.

*25. A polyester film having a light transmittance of 50% or less, a bending angle in the range of 30° to 90°, and a rupture strength after being bent of 8 kg/mm$^2$ or more.*

*26. The polyester film according to claim 25, which is a multilayer film having a cavity inclusion rate gradually increasing from the front layer towards the back layer along the thickness direction of the film.*

*27. A polymer film comprising a polyester and a thermoplastic resin incompatible with the polyester,*

*wherein the polymer film is oriented along at least one axis and has minute cavities formed by the orientation, and the density of the film is in the range of 1.05 g/cm$^3$ to 1.3 g/cm$^3$.*

*28. A polymer film comprising a polyester and a thermoplastic resin incompatible with the polyester,*

*wherein the polymer film is oriented along at least one axis and has minute cavities formed by the orientation, and the density of the film is in the range of 1.05 g/cm$^3$ to 1.3 g/cm$^3$, the polymer film having a light transmittance of 50% or less, a bending angle in the range of 30° to 90°, and rupture strength after being bent of 8 kg/mm$^2$ or more.*

* * * * *